United States Patent [19]

Hoffman

[11] Patent Number: 4,900,356
[45] Date of Patent: Feb. 13, 1990

[54] PROCESS AND APPARATUS FOR PRODUCING METALLIZED PELLETS AND SCRUBBING SPENT REDUCING GAS

[75] Inventor: Thomas W. Hoffman, Charlotte, N.C.

[73] Assignee: Midrex International B.V., Zurich, Switzerland

[21] Appl. No.: 162,438

[22] Filed: Mar. 1, 1988

Related U.S. Application Data

[63] Continuation-in-part of Ser. No. 853,275, Apr. 17, 1986, abandoned.

[51] Int. Cl.[4] .................. C21B 13/02; F27B 1/18
[52] U.S. Cl. ................................. 75/35; 266/156
[58] Field of Search .......................... 75/35; 266/156

[56] References Cited

U.S. PATENT DOCUMENTS 4,049,441 9/1977 Jaco, Jr. et al. .................. 75/35
4,246,243 1/1981 Fox .................................. 75/25

Primary Examiner—Melvyn J. Andrews
Attorney, Agent, or Firm—Ralph H. Dougherty

[57] ABSTRACT

An improved method and apparatus for producing metallized iron or other metal by direct reduction of particulate metal oxide is disclosed. Spent reducing gas is recycled from a reduction furnace through a cooler-scrubber and a catalyst-containing stoichiometric gas reformer. In the cooler-scrubber, the spent reducing gas interacts with scrub water. Dust having an affinity for sulfur is recovered from the process and added to the scrub water causing sulfur in the spent reducing gas to form solids which precipitate and are removed as solid waste. Lowering the sulfur content of the spent reducing gas reduces the sulfur contamination of the catalyst and improves the efficiency of the process.

6 Claims, 2 Drawing Sheets

PROCESS AND APPARATUS FOR PRODUCING METALLIZED PELLETS AND SCRUBBING SPENT REDUCING GAS

CROSS REFERENCE TO RELATED APPLICATION

This application is a continuation-in-part application of copending U.S. patent application Ser. No. 853,275, filed Apr. 17, 1986, now abandoned.

BACKGROUND OF THE INVENTION

Direct reduction processes for producing metallized iron from iron oxide pellets, lump ores, or similar materials which include iron oxide, are widely known and used in the steel industry. Suitable direct reduction processes for forming metallized iron are disclosed in U.S. Pat. Nos. 3,128,174 and 3,881,916. In a direct reduction process such as the Midrex Process, pellets of metal oxides are introduced at top of a shaft furnace to establish gravitational flow therethrough. Reducing gas consisting essentially of carbon monoxide and hydrogen is heated to sufficient temperature to effect direct reduction, is introduced to the metal oxide burden in the furnace, passes through the burden in counter-flow relation to the gravitationally descending burden, and reacts with the burden, forming metallized pellets and a reacted top gas consisting principally of carbon dioxide and water along with some unreacted reductants, which are drawn off as sulfur-containing spent top gas.

Additionally, U.S. Pat. No. 3,748,120 discloses a shaft furnace direct reduction process in which spent reduction gas is catalytically reformed from a mixture of gaseous hydrocarbon and spent reducing gas from the reduction process. In this process the spent reducing gas is cleaned and cooled upon exiting the reduction furnace and prior to being introduced into a catalyst-containing reformer. In the direct reduction process the reducing gas passes through and reacts with the burden to produce sulfur containing gases which contaminate the catalyst. Sulfur contamination of the catalyst lowers the overall efficiency of the process. Processes for reducing the sulfur level in the recycled spent reducing gas by increasing the metallic ion content of the scrub water utilized by the cooler-scrubber or by introducing a sulfur reducing agent into the spent reducing gas are also known. U.S. Pat. No. 4,019,441 teaches the introduction of a soluble salt into spent gas scrubber water.

By contrast with prior art processes, which require a specialized sulfur reducing agent, the present invention provides an improved method and apparatus for reducing the sulfur contamination of the gas reformer catalyst by selectively introducing into the scrub water insoluble process dust having an affinity for sulfur. The spent reducing gas interacts with the dust-laden scrub water, reducing the sulfur content of the recycled spent reducing gas, thereby reducing the sulfur contamination of the gas reformer catalyst.

BRIEF SUMMARY OF THE INVENTION

An improved method and apparatus for decreasing the sulfur content of the recycled spent reducing gas in a direct reduction process is disclosed. Dust, including components having an affinity for sulfur, is recovered from the process and introduced in controlled quantities into the scrub water to increase the interaction between the dust-laden scrub water and the spent reducing gas whereby the sulfur containing components of the spent reducing gas are lowered, thereby reducing the sulfur contamination of the gas reformer catalyst. The effect of reducing sulfur contamination of the gas reformer catalyst is to improve the overall efficiency of the direct reduction process.

OBJECTS OF THE INVENTION

It is the principal object of this invention to provide an improved process for producing metallized pellets in a shaft furnace direct reduction process wherein reducing gas is formed in a stoichiometric reformer, including means for utilizing spent reducing gas as reformer gas feed while reducing sulfur contamination of the reformer catalyst.

It is also an object of this invention to provide apparatus for reducing sulfur contamination of catalyst in a stoichiometric reformer used in conjunction with a direct reduction shaft furnace.

DESCRIPTION OF THE PREFERRED EMBODIMENT

Figure 1:
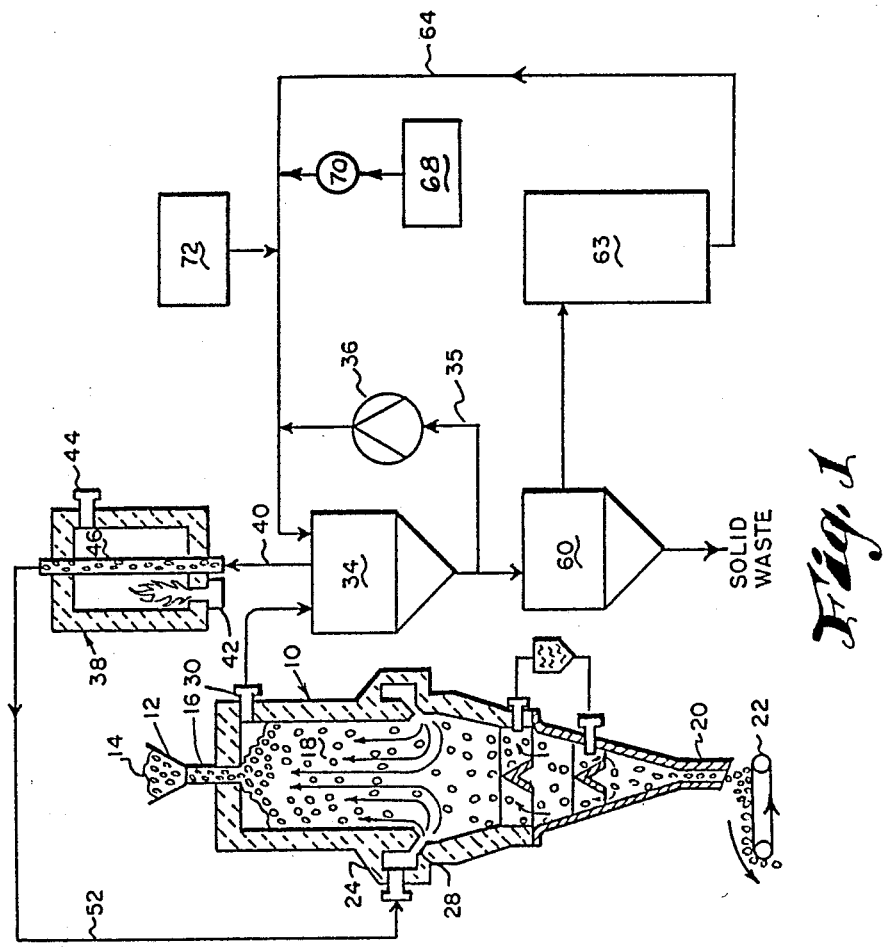
FIG. 1 is a schematic diagram of a vertical shaft furnace and its associated equipment for producing metallized iron in accordance with the preferred embodiment of the invention.

Referring now to FIG. 1, a vertical shaft furnace 10 has a feed hopper 12 mounted thereon into which iron oxide 14, such as iron oxide pellets, lump ore, or similar material is placed. The force of gravity causes the iron oxide to flow through a feed pipe 16 to form a packed bed burden 18 within the shaft furnace 10. As is conventional, metallized iron, preferably in the form of pellets or lumps, descends through the furnace, exiting through discharge pipe 20, and is removed by conveyor 22. Adding particulate iron oxide material to the hopper 12 establishes a gravitational burden flow through the shaft furnace 10, comprising an input of iron oxide material 14 and an output of particulate metallized iron.

The furnace 10 is surrounded by a bustle and tuyere system generally illustrated at 24. Reducing gas is introduced into the furnace 10 through a gas port 28 and a gas pipe 52. Reacted or spent reducing gas, with process dust entrained therein, is removed from the upper portion of the furnace 10 through a gas off-take pipe 30. The off-take pipe 30, through which spent reducing gas leaves the furnace is coupled to a cooler-scrubber 34. The cooler-scrubber 34 is a conventional venturi scrubber surrounded by an annular or sectional packed bed cooler and employs a recirculating scrub water system. The spent reducing gas flows downwardly through the venturi and upwardly through the packed bed through which scrub water descends, providing intimate contact of the spent reducing gas with the scrub water, and removing the entrained dust from the gas into the scrub water, forming a flowable sludge or dust-laden scrub water.

Waste (used) dust-laden scrub water is removed as underflow from the cooler-scrubber 34 and is divided into first and second portions. The first portion passes through pipe 35 to a pump 36 and is recirculated to the cooler-scrubber 34 as a portion of the scrub water. The second portion of the waste scrub water flows from the cooler-scrubber 34 to a clarifier 60 which removes particulate materials to produce clean or clarified hot water. Particulate material removed from the waste water is discharged as solid waste from the clarifier 60, and removed using any convenient means. The clean water is passed through and cooled by cooling tower 63. The water, after being cleaned and cooled by clarifier 60 and cooling tower 63, is pumped through pipe 64 and combined with the discharge of recirculating pump 36 to form the scrub water introduced to the cooler-scrubber 34. Additional metallic ions may be supplied by a conventional metallic ion source 68 and added to the scrub water at a controlled rate by a suitable flow control or metering device 70.

Cooler-scrubber 34 is connected by pipe 40 with the inlet of stoichiometric reformer 38. A plurality of indirect heat exchanger catalyst-containing tubes 46 are positioned in the reformer 38 and are heated by burners 42. Cleaned and cooled spent reducing gas flows through the catalyst tubes 46 of the reformer 38 wherein it is reformed to hot reducing gas comprising principally hydrogen and carbon monoxide, then is fed to the bustle and tuyere system 24 through the pipe 52, as previously discussed.

It has been demonstrated that the system illustrated in FIG. 1 substantially lowers the sulfur content of the spent reducing gas, the result being less sulfur contamination of the catalyst 46. It is believed that the sludge or dust-bearing waste water removed from the cooler-scrubber 34 includes metallic-ion-containing process dust having an affinity for sulfur. Recirculating a portion of this waste water through pipe 35 and pump 36 as scrub water increases the concentration of process dust particles in the scrub water. Increasing the concentration of process dust in the scrub water increases the interaction between the scrub water and the spent reducing gas in the cooler-scrubber. As the spent reducing gas interacts with the process dust laden scrub water, sulfur-containing solids are formed which precipitate out and are removed as solid waste by the clarifier 60. The interaction between the process dust and the sulfur containing portions of the spent reducing gas is believed to be due to metallic ions contained in the process dust. Other interactions between the spent reducing gas and the process dust laden scrub water (not fully understood at this time) are also probable.

Some water loss is experienced through the discharge of the particulates and solid wastes from the clarifier 60 and from other sources. This loss is compensated for by adding a suitable amount of feed water to the pipe 64 from a conventional make-up water source 72.

ALTERNATIVE EMBODIMENTS

Figure 2:
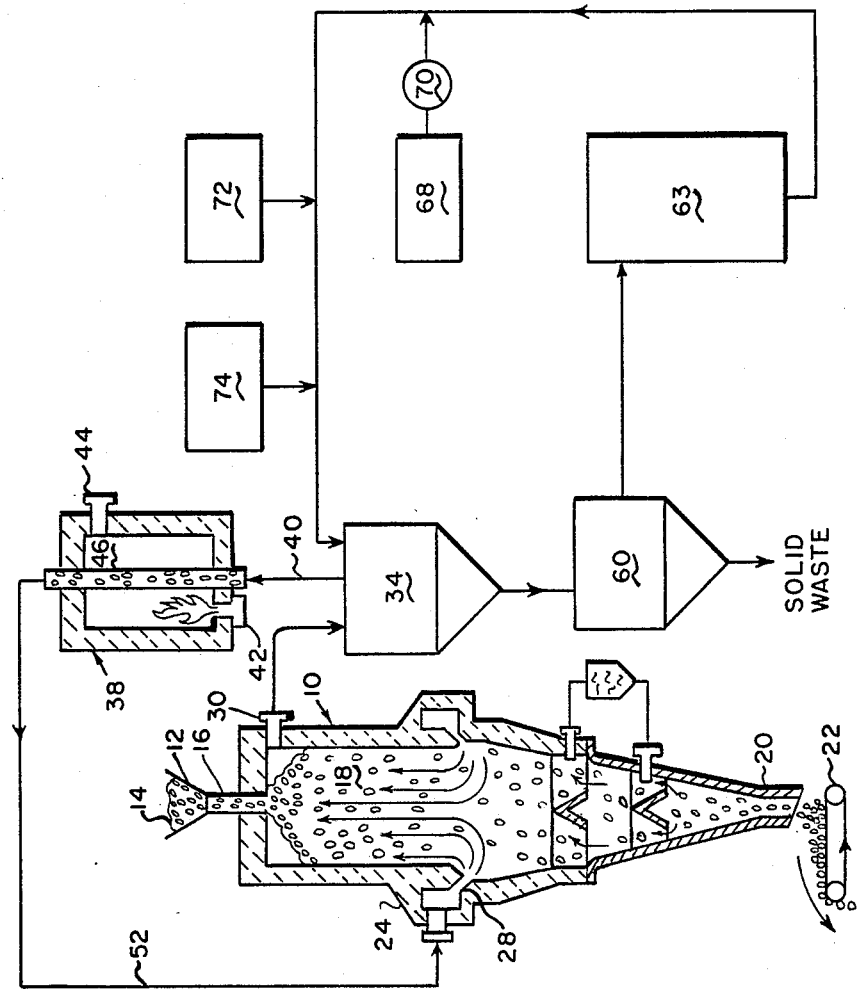
FIG. 2 is a schematic diagram similar to FIG. 1, but illustrating an alternative embodiment of the invention.

FIG. 2 illustrates an alternate embodiment of the invention wherein the method used to control the process dust content or the scrub water differs somewhat from that of FIG. 1. Optionally, metallic ions, such as iron, cobalt, or nickel, may be added to the scrub water at a controlled rate.

In this embodiment, a process dust recovery system 74 recovers process dust using any convenient means. This process dust, which could be solid waste from clarifier 60, is then combined with water and added to the scrub water. Additional metallic ions may be supplied by a conventional metallic ion source 68 and added to the scrub water at a controlled rate by a suitable flow control or metering device 70. The remaining portions of this system are essentially identical to those set forth in FIG. 1 and will thus need not be described in detail.

The catalyst 46 includes active ions such as nickel oxide which are believed to provide "active sites" in the course surfaces of the catalyst carrier. Catalyzation is thought to take place at or near the active sites (see Roberton, AFP Catalyst of Gas Reaction by Metal, Logas, (1970).

Sulfur compounds mask or reduce the activity of these active sites. An excess of sulfur adhering to the sites in the catalyst carrier will reduce catalyst effectiveness by reducing the area or number of active sites. Thus, the presence of sulfur can poison the catalyst. The invented process and apparatus removes sulfur from the spent reduction gas, thereby reducing the sulfur contamination of the active sites of the catalyst 46. Reducing the sulfur contamination of the catalyst 46 improves the efficiency of the process.

"Pellets" as used throughout this specification and claims means: pellets, lumps, nodules, pieces, granules, agglomerated particulates, and the like, which are small enough to flow through a direct reduction furnace and to have sufficient surface area to react with reducing gas passing therethrough, yet large enough to support the weight of the burden. Finely divided material, which would plug the interstices between the pellets, blocking the gas passageway around them, are not included in the definition of pellets.

"Metallized", as used throughout this specification, does not mean coated with metal, but means nearly completely reduced to the metallic state, i.e., always in excess of 60% metal, and usually in excess of 80% metal in the material. Such metallized iron in many forms, including pellets and lump, is well suited as feed material to steelmaking furnaces such as an electric arc furnace.

Although the invention has been disclosed and described with respect to a process for the direct reduction of iron oxide to form metallized iron, other metal oxide ores such as nickel or cobalt oxide, for example, can be reduced to the metallized state using the disclosed process and apparatus. All such alternative uses of the disclosed process and apparatus are within the scope of the invention.

From the foregoing, it is readily apparent that an improved direct reduction process and apparatus which reduces the sulfur contamination of the reformer catalyst has been invented.

What is claimed is:

1. In a process for producing metallized iron pellets by direct reduction of iron oxide, the method including the steps of passing a reducing gas through a furnace having a reducing zone containing sulfur-bearing iron oxide material therein, reacting said reducing gas with said iron oxide material to produce metallized pellets, a sulfur-containing spent reducing gas, and iron-rich partially reduced process dust carried by said spent reducing gas, removing said sulfur-containing spent reducing gas and said dust from said furnace, introducing said spent reducing gas, dust and scrub water into a cooler-scrubber to cool and scrub said spent reducing gas to produce cooled spent reducing gas and dust-laden waste scrub water, removing waste scrub water from the cooler-scrubber, introducing removed waste scrub water into a clarifier to produce substantially dust-free scrub water, reforming said cooled spent reducing gas into an effective reducing gas, and introducing said reducing gas into said reducing zone; the improvement comprising:

upon removal from the cooler-scrubber, dividing said dust-laden waste scrub water into first and second portions, and combining the second portion with the output of the clarifier to control the process dust content of said scrub water, thereby selectively introducing iron-rich partially reduced process dust into said scrub water to produce dust-laden scrub water, whereby said dust-laden scrub water interacts with sulfur-containing components in said spent reducing gas, thereby reducing the sulfur content of said reducing gas.

2. A process in accordance with claim 1 further comprising the additional step of introducing additional selected metallic ions selected from the group comprising ions of iron, nickel and cobalt, into said scrub water.

3. A process in accordance with claim 1 further comprising adding a suitable amount of additional water to the scrub water to compensate for water loss.

4. Apparatus for the direct reduction of metal oxide pellets to form metallized pellets, comprising:
   (a) a vertical shaft furnace having charging means and carrying a gravitationally descending burden therein;
   (b) means for introducing a reducing gas into said furnace to react with said burden and form a spent reducing gas;
   (c) spent gas removal means at the upper end of said furnace for removing spent reducing gas from said furnace;
   (d) cooler-scrubber means communicating with said spent reducing gas removal means for cooling and scrubbing said spent reducing gas, said cooler-scrubber means including means for introducing scrub water thereto and water removal means for removing dust-laden scrub water from said cooler-scrubber;
   (e) means communicating with said water removal means for dividing said removed dust-laden scrubber water into a first portion and a second portion;
   (f) means communicating with said cooler-scrubber for clarifying said first portion of removed scrub water to render it substantially dust free;
   (g) means communicating with said clarifying means and with said scrub water introducing means for cooling said dust free water;
   (h) means for combining said second portion of removed dust-laden scrubber water with cooled and clarified water to produce said dust-laden scrub water to maintain sufficient dust in said scrub water to react with sulfur in said spent reducing gas, thereby reducing the sulfur content of said spent reducing gas, and forming a cleaned, cooled spent reducing gas;
   (i) a hot gas reformer; and
   (j) means for recycling said cleaned, cooled spent reducing gas through said hot gas reformer to produce said reducing gas.

5. Apparatus in accordance with claim 4 further comprising an additional source of metallic ions and means for injecting said metallic ions into said scrub water at a predetermined rate whereby reduced sulfur in said scrub water reacts with said metallic ions to produce solids containing sulfur.

6. Apparatus in accordance with claim 4 further comprising a source of make-up water and means for injecting make-up water into the scrub water to increase the flowability of the scrub water.

* * * * *